United States Patent [19]
Evans

[11] 3,761,922
[45] Sept. 25, 1973

[54] DIGITAL MEAN LEVEL DETECTOR

[75] Inventor: Norol T. Evans, San Pedro, Calif.

[73] Assignee: Hughes Aircraft Company, Culver City, Calif.

[22] Filed: Oct. 12, 1971

[21] Appl. No.: 188,435

[52] U.S. Cl............ 343/5 DP, 343/7 A, 343/17.1 R
[51] Int. Cl............................................. G01s 7/34
[58] Field of Search.................... 343/5 DP, 17.1 R, 343/7 A

[56] References Cited
UNITED STATES PATENTS

| | | | |
|---|---|---|---|
| 3,500,396 | 3/1970 | Lampert et al. | 343/7 A |
| 3,617,998 | 11/1971 | Freedman | 343/7 A |
| 3,487,405 | 12/1969 | Molho et al. | 343/5 DP |
| 3,149,333 | 9/1964 | Campbell | 343/17.1 R |
| 3,631,486 | 12/1971 | Anders et al. | 343/5 DP |

*Primary Examiner*—Benjamin A. Borchelt
*Assistant Examiner*—G. E. Montone
*Attorney*—W. H. MacAllister, Jr. et al.

[57] ABSTRACT

A digital mean level detector that processes the digital radar data so that the mean or RMS noise level is accurately determined and selected offset threshold levels can be varied to provide highly accurate and reliable signal detection. The system first provides mean level detection of the digital input signal which is applied to a threshold compare circuit having a plurality of thresholds such as two, for example. The output signals of the threshold compare circuit are encoded and sent both to a delay register and to an accumulator, with the outputs of both being applied to a subtractor for eliminating the oldest signal of a moving window sum held in the accumulator. The signal at the output of the subtractor is applied to the accumulator where it is added to the present signal at the output of the threshold compare circuit. At each range bin, the accumulated sum is then compared with an expected count representing the mean level of the noise for the selected number of range bins. The difference, representative of a predetermined error of the input noise level, is then adjusted and used to correct a signal detector having an offset threshold as determined by selected detection codes.

7 Claims, 6 Drawing Figures

DIGITAL MEAN LEVEL DETECTOR

BACKGROUND OF THE INVENTION

1. Field of the Invention

This invention relates to radar detection systems and more particularly to a digital mean level detector that accurately and reliably determines the input noise level and provides a controlled offset threshold level for operation with desired performance characteristics.

2. Description of the Prior Art

Conventionally for systems requiring substantially accurate detection of radar signals with desired performance characteristics such as with a constant false alarm rate, analog mean level detectors may be utilized such as described in U.S. Pat. No. 3,057,995 and digital mean level detectors may be utilized such as those using conventional digital integrator or accumulator arrangements. The analog mean level detector systems generally have an exponential weighting of the data over several adjacent range or doppler bins which tends to substantially increase the measurement error. A digital mean level detector constructed as an exact dual of the analog system would have the undesirable weighting characteristics of the analog mean level detector. Also, in systems requiring digital operation, the analog system cannot be used without additional digital to analog signal conversions. The digital integrator approach has been found to be unable to measure the RMS (root mean square) noise level to a high degree of accuracy because of various problems associated therewith. In a digital integrator system, input noise quantized in amplitude to 8 bits, for example, at each range bin is applied to an accumulator operating as a moving window to calculate the sum of a selected number of adjacent range bins. The accumulated sum then represents the mean noise level of the input signal. A problem associated with this type of detector is that a very large number of bits are required to be processed through the moving window in order to obtain representative results. Also, the digital integrator allows large targets to greatly desensitize the detector capability of the system, and further has the disadvantage that a larger sigma or measure of error is provided at its output than is desirable, when occasional targets are present. It would be a substantial advantage to the art if a digital mean level detector were provided that was substantially insensitive to high level signals such as target signals, and that allowed accurate determination of noise levels with a minimum number of samples.

SUMMARY OF THE INVENTION

The digital mean level detector in accordance with the principles of the invention receives the input signal which is quantized at each range bin, and then applies a signal to both a threshold comparator circuit and to a signal delay register. The input signal may be hard limited in some arrangements in accordance with the invention. The threshold comparator circuit includes a plurality of threshold circuits each providing a signal which, after being passed through an encoder, is applied to a shift register having a storage equal to a predetermined number of range bins, forming a moving window. The output of the encoder is also applied through an adder circuit to an accumulator which in turn applies an accumulated sum to a subtractor circuit. The output of the subtractor circuit representing the difference between the accumulated sum and the oldest bit in the shift register is also applied to the adder for being combined with the newest threshold data. At each range bin, the accumulated sum is also sent to a subtractor and comparator circuit where it is subtracted from an expected count value which may be 96 for the illustrated arrangement. The difference which relates to the decibels of error of the detected mean level of the noise from the expected level is then appropriately scaled and applied to a signal detector circuit. The detector circuit which may include a plurality of detection thresholds for selection of offset levels having desired system performance characteristics, changes the detection threshold as a function of the difference value so as to maintain the selected performance characteristics. The detected signal is then sent to suitable utilization circuits. Thus the signal is relatively insensitive to a large amplitude target signal both because of the hard limiting and because of the subtraction of the oldest bit from the accumulated moving window sum.

It is therefore an object of this invention to provide a simplified and highly accurate mean level detector.

It is another object of this invention to provide a mean level detector that is relatively insensitive to large target signals or noise excursions.

It is another object of this invention to provide a mean level detector system that provides selection of a desired system performance characteristic such as a constant false alarm rate without decreasing the reliability of the detection.

It is still another object of this invention to provide a noise measuring detector that determines the mean noise level with a high degree of accuracy.

It is another object of this invention to provide a mean level detector in which various types of weightings can be implemented to provide desired performance characteristics.

BRIEF DESCRIPTION OF THE DRAWINGS

The novel features of this invention as well as the invention itself, both as to its method of organization and method of operation, will best be understood from the accompanying description, taken in connection with the accompanying drawings, in which like reference characters refer to like parts, and in which:

FIG. 3 is a graph of accumulated count versus input noise level in a 32 range bin moving window for explaining the operation of the mean level detector in accordance with the invention;

DESCRIPTION OF THE PREFERRED EMBODIMENT

Figure 1:
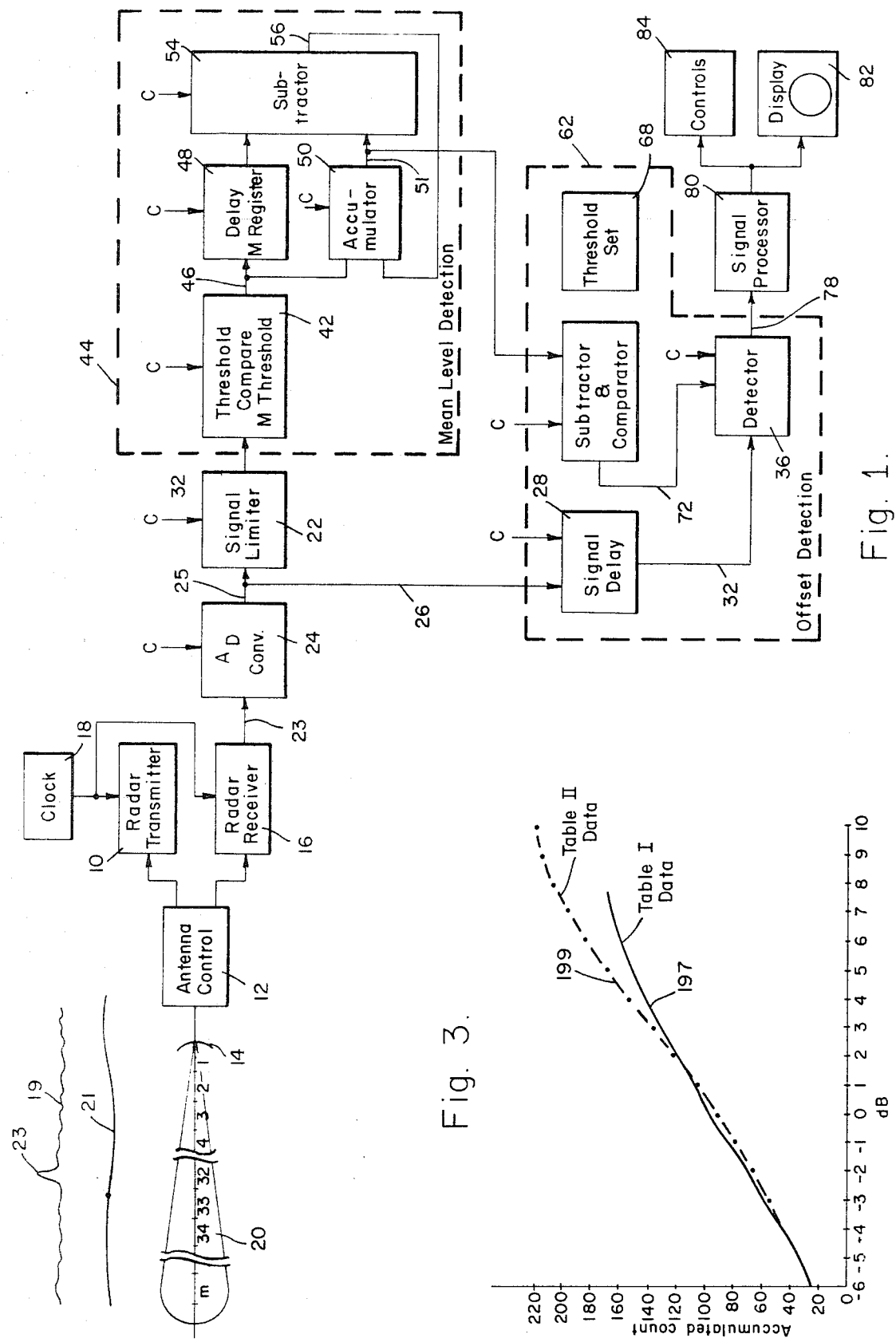
FIG. 1 is a schematic block diagram showing the mean level detector system in accordance with the invention.

Referring first to FIG. 1, the mean level detector system may operate in a radar system which may include a radar transmitter 10 that applies pulses of energy through an antenna control unit 12 and through a suitable antenna 14 for radiation into space. The return energy, reflected from targets (not shown), and including the target energy and noise energy is intercepted by the antenna 14 and applied through the antenna control unit 12 to a suitable radar receiver 16 responsive to a clock 18 which, for example, in the illustrated arrangement may define range bins 1 to $m$ as shown in the radar beam or lobe 20 extending into space. The radar receiver 16 may divide the signal into in-phase and quadrature signals to then be recombined at the output of either a digital MTI or a digital doppler filter bank of a doppler processor, which may provide a digital signal representing the signal level in each range bin for application to a signal limiter 22. If the radar signal is in the analog form in the receiver a suitable A to D converter 24 is provided at the output of the radar receiver 16, which signal, for example, may be an 8 bit signal representing the signal amplitude in each range bin and which is applied to the signal limiter 22. The 8 bit radar signal is also applied through a composite lead 26 to a signal delay circuit or unit 28 having a delay or digital storage selected equal to one-half of the width of the moving window. The signal limiter 22 may, for example, pass only the two least significant bits of the 8 bit number representing the signal amplitude, through a composite lead 32 to a detector unit 44 so as to provide the amplitude limiting. The signal passed by the limiter 22 is then applied to a threshold compare circuit 42 of a mean level detection unit 44, and in turn after encoding in the circuit 42, through a composite lead 46 to delay register unit 48 as well as to an accumulator unit 50.

A subtractor 54 receives the oldest signal from the delay register unit 48 and the accumulated sum from the accumulator 50 and develops a difference signal which is applied through a composite lead 56 to the second input of the accumulator 50. The accumulator mean level for the selected number of range bins for the moving window is then applied from a composite lead 51 to a subtractor and comparator circuit 60 of an offset detection unit 62, which subtractor circuit subtracts the accumulated mean level noise signal from an expected count. A threshold set circuit 68 may be utilized to apply desired threshold levels to the subtractor and comparator unit 60 for setting detection levels such as, for example, to provide a desired constant false alarm rate. The signal of a waveform 19 of amplitude versus time shows the incoming noise signal with a target signal 23 at video frequency, for example. The signal of a waveform 21 shows the mean level voltage provided by the mean level detection operation in accordance with the invention.

The threshold level provided by the subtractor and comparator circuit 60 is then applied through a composite lead 72 to the detector 36 which may include a plurality of detector circuits for providing detected signals at a different or relative to different threshold levels. The output of the detector is then applied through a composite lead 78 to a suitable signal processor 80 and in turn to suitable utilization units such as a display console 82 and a control unit 84. Thus the system of FIG. 1 samples the signal, determines the mean level of the noise and utilizes this determination to correct an offset detector.

Figure 2:
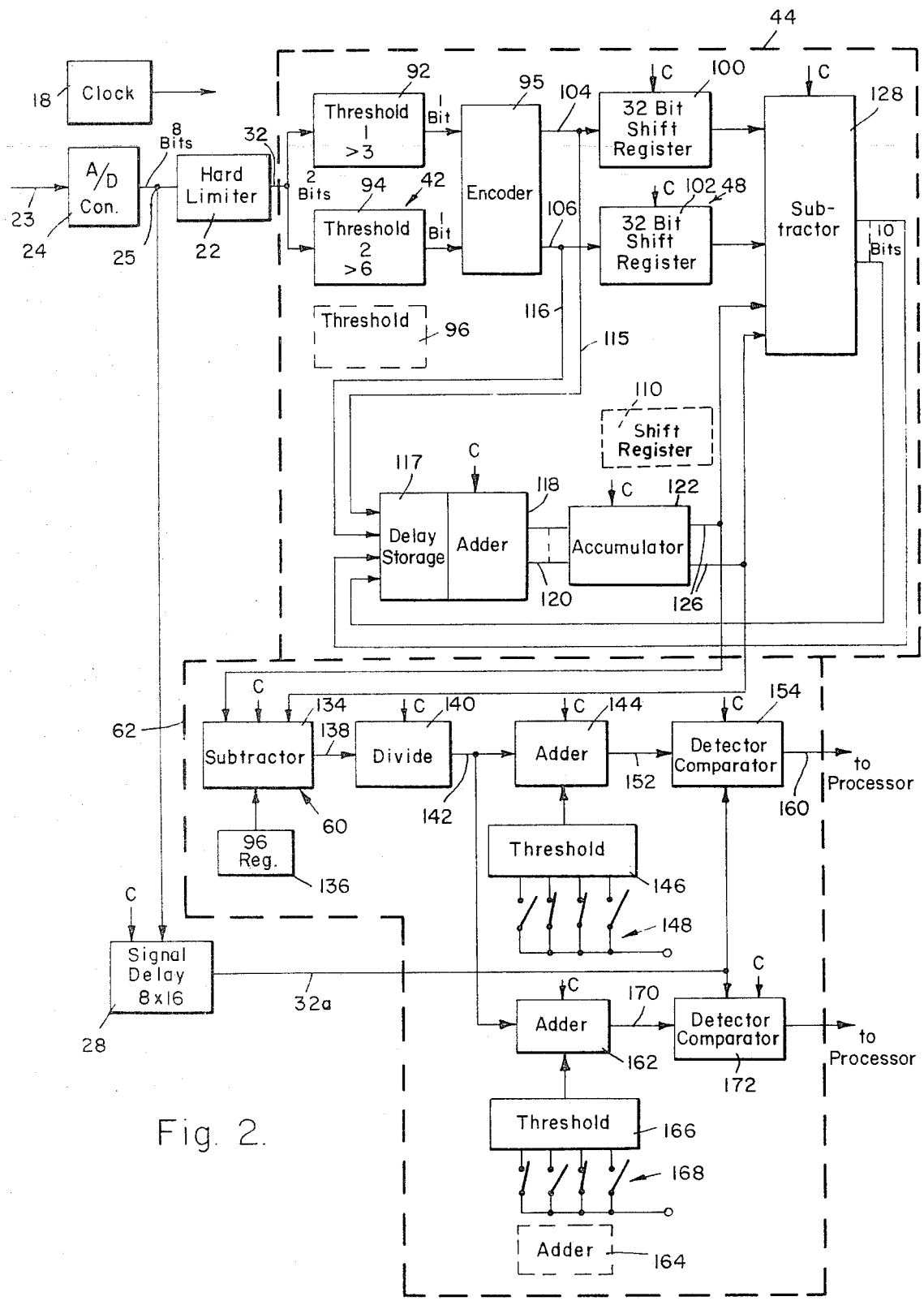
FIG. 2 is a schematic block and circuit diagram showing the mean level detection system of FIG. 1 in further detail.

Referring now to FIG. 2, which shows an illustrative example of a mean detector system in accordance with the invention in greater detail, signals from the radar receiver on the lead 23 may be applied through the A to D converter 24 (or received in digital form from the radar receiver) to provide an 8 bit signal on the lead 25 which is applied to the hard limiter 22 as well as to the signal delay circuit 28. The hard limiter then passes a selected number of bits such as the two least significant bits to the composite lead 32 and to n threshold circuits 92, 94, 96 of the circuit 42, each respectively representing a different threshold level such as a digital value greater than 3 and greater than 6 for the respective circuits 92 and 94. Each of the threshold circuits 92, 94 and 96 may be a conventional digital compare circuit to provide a signal in response to an input signal compared to a stored signal, as is well known in the art. Single binary bit signals provided by the threshold circuits 92 and 94 are respectively applied to an encoder 95 which in turn applies single bit signals to 32 bit shift registers 100 and 102 through respective leads 104 and 106. A shift register 110, shown dotted, indicates that additional threshold levels with appropriate encoding may be utilized within the scope of the invention. The signals on the lead 104 and 106 are also applied through respective leads 115 and 116 to a delay unit or register 117 to an adder 118 and in turn through a composite lead 120 to an accumulator 122, the composite lead 120, for example, transferring 8 binary bits. The accumulator 122 may be any conventional memory storing an accumulated sum which is applied through a composite lead 126 to a subtractor 128 which in turn also receives the oldest bits from the shift registers 100 and 102. The subtractor 128 then develops a signal equal to the difference between the oldest count and the accumulated count and applies a signal through a composite lead 56 and through the delay register 117 to a second input of the adder 118. The accumulated signal on the composite lead 126 is also applied to a subtractor 134 of the subtractor and comparator circuit 60 where it is subtracted from the count of 96 provided by a register 136. The subtractor 134 provides the deviation from the expected mean sum of 96, which signal is applied through a lead 138 to a divide by 8 circuit 40 to provide a scaled signal indicative of the number of decibels of deviation of the measured noise level. The scaled signal is then applied from the circuit 140 through a lead 142 to an adder 144 and also receives a selected threshold value from a threshold circuit 146 as provided by selection switches 148. The adder 144 corrects the threshold level during each range bin and applies that digital number through a composite lead 152 to the detector comparator 154 to maintain a selected constant false alarm rate or any desired performance characteristic. The detected signal of the delayed or oldest digital signal in the 16 clock delay shift register or delay circuit 28 is then applied through a suitable lead 160 to processor or other utilization unit.

In order to provide the desired number of detector thresholds the unit 62 may also include adder 162 and may include other adders such as 164, shown dotted, to indicate any desired number of thresholds that may be utilized within the principles of the invention. The adder 162 receives the scaled signal from the lead 142 and a signal from a threshold circuit 166 in turn controlled by input switching circuit 168 to apply a signal through a composite lead 170 to a detector comparator circuit 172, the output also being applied to the processors, for example.

Figure 4:
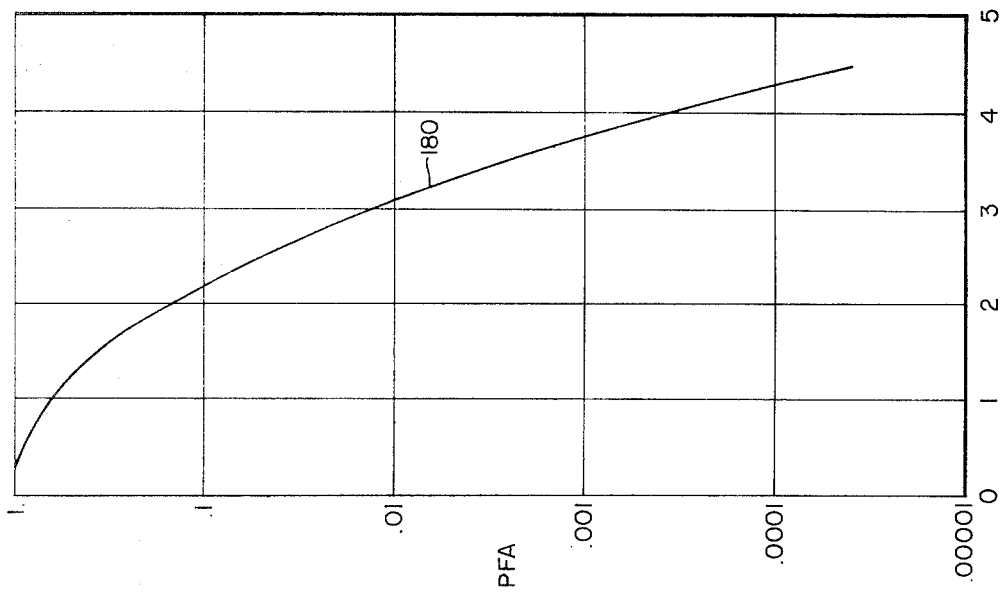
FIG. 4 is a graph of probability of false alarm versus volts with the probability of false alarm axis having a log distribution for explaining the operation of the mean level detector for a Rayleigh distribution in accordance with the principles of the invention.

Referring now to FIGS. 3 and 4, the operation of the detector system will be further explained. The input noise signal (receiver noise and other noise such as received noise) is assumed to be Rayleigh distributed as shown by a curve 180 of FIG. 4 over the indicated voltage threshold range. The detector of the invention determines the mean level of the receiver noise for a Rayleigh probability distribution. The $\sigma \sqrt{\pi/2}$ is the mean value or level determined by the detector of the invention based on a Rayleigh distribution. However, the invention is not to be limited to a Rayleigh distribution but includes other appropriate probability distributions. The Rayleigh distribution may be defined as $$L/\sigma^2 \ e - L^2/2\sigma^2$$

where $L$ is the voltage level of the input signal. The weighting on the conditions of the threshold detector 42, using two levels $T_1$ and $T_2$ are below the lowest threshold, above the first threshold $T_1$ but below the second $T_2$ and above the highest threshold $T_2$ is selected by the following equations:

$n_x = W_1 P_1 + W_2 P_2 + W_3 P_3$ where $T_1 = 10$ and $T_2 = 100$ and $P_3 = 1/6$, $P_2 = \frac{1}{2}$ and $P_1 = \frac{1}{3}$. Thus $n_x = \frac{1}{3} W_1 + \frac{1}{2} W_2 + 1/6 W_3 = 0$ and if $W_2 = +1$ then $W_1 = -3$ and $W_3 = +3$. If all positive numbers are used for processing then $W_1 = 0$, $W_2 = 4$, $W_3 = 6$ and $n_x = W_2 P_2 + W_3 P_3 = 3$, which is the RMS noise level.

The following table shows the intermediate calculations and the moving window total over a 32 range bin sample and the mean level of 32 or $n_y = 3 \times 32 = 96$ is achieved, the count of 96 being the expected noise level.

TABLE I

Input Noise Level Versus The Expected Level

| Level | $T_1$ | $P_1$ | $T_2$ | $P_2$ | $n_y$ |
|---|---|---|---|---|---|
| −6 db | 1.884 | 0.18 | 3.768 | 0.0007 | 24.03 |
| −5 db | 1.68 | 0.24 | 3.36 | 0.0038 | 30.93 |
| −4 db | 1.495 | 0.33 | 2.99 | 0.012 | 43.0 |
| −3 db | 1.33 | 0.42 | 2.66 | 0.032 | 58.15 |
| −2 db | 1.185 | 0.5 | 2.37 | 0.064 | 68.0 |
| −1 db | 1.055 | 0.58 | 2.110 | 0.112 | 81.5 |
| 0 db | 0.94 | 0.65 | 1.88 | 0.18 | 96.0 |
| +1 db | 0.838 | 0.7 | 1.676 | 0.26 | 106.0 |
| +2 db | 0.745 | 0.75 | 1.490 | 0.34 | 118.0 |
| +3 db | 0.665 | 0.79 | 1.330 | 0.42 | 128.0 |
| +4 db | 0.593 | 0.83 | 1.186 | 0.50 | 138.0 |
| +5 db | 0.528 | 0.87 | 1.056 | 0.58 | 149.0 |
| +6 db | 0.47 | 0.9 | 0.94 | 0.66 | 158.0 |
| +7 db | 0.42 | 0.92 | 0.84 | 0.7 | 162.0 |
| +8 db | 0.37 | 0.93 | 0.75 | 0.75 | 167.0 |

The above table is calculated from the equation:

$$32 [ 4 (P_1 - P_2) ] = 96.$$

It is to be noted that the above table also shows the effect of changing the input noise level in one db steps from the expected noise level to provide $n_y$ which is the expected count if that noise level is selected. The above table for which the input noise level as expected is 0 db, has an expected count of 96 as shown by a distribution curve 197 in FIG. 3 for Table I data.

Figure 5:
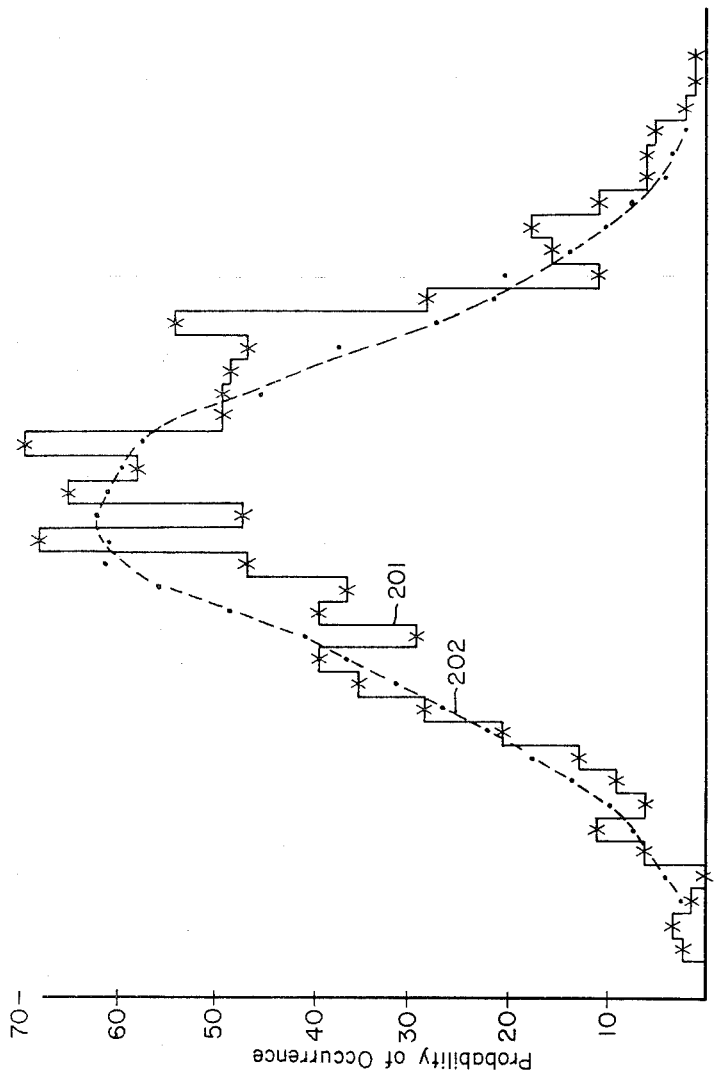
FIG. 5 is a schematic diagram of experimental and calculated curves of probability of occurrence versus accumulated count in 32 range bins explaining the operation of the invention.

Referring also to FIG. 5, the results of a computer simulation for 10,000 samples is shown by a curve 201 with the count plotted as a function of probability of occurrence. This statistical type simulation was for three discrete occurrence levels P (X) of 1/6, 2/6 and 3/6 respectively having assigned weights $W$ of 0, 4 and 6 and respective amplitudes of 2/6, 12/6 and 6/6. A curve 202 shows the calculated curve which corresponds substantially with the experimental curve with the expected count of 96.

The accuracy of determining the mean levels for the condition of FIG. 5 may be estimated as follows:

$$\mu = \sum_n W_n P(\mu = W_n) = \sum_n W_n P_n$$

$$\mu = 0 \cdot 2/6 + 4 \cdot 3/6 + 6 \cdot 1/6 = 3$$

where $\mu$ = mean signal level, $W_n$ = the assigned weight, and $P_n$ = the probability.

$$\sigma_x^2 = \sum_n (W_n - \mu)^2 P(W = \mu) = (0-3)^2 \cdot \frac{2}{6}$$
$$+ (4-3)^2 \cdot \frac{3}{6} + (6-3)^2 \cdot \frac{1}{6}$$

$\sigma_x^2 = 5$ where $\sigma_x^2$ is the variance about the mean looking at one sample event.

$$\sigma_y^2 = 32 \ \sigma_x^2 = 160$$
$$\sigma_y = \sqrt{160} = 12.6$$

where $\sigma_y^2$ is an average variance about the mean over 32 range bins, for example. Thus the count of 96 has a 1 sigma uncertainty of plus or minus 12.6 as an upper bound.

The second example of a processor in accordance with the invention with more dynamic range has also been determined with $W_1 = 0$, $W_2 = 4$ and $W_3 = 8$ as shown in the following table:

TABLE II

Input Noise Level Versus The Expected Level

| Level | $V_1$ | $P_1$ | $V_2$ | $P_2$ | $n_y$ |
|---|---|---|---|---|---|
| −6 db | 1.88 | 0.18 | 4.7 | $10^{-5}$ | 23 |
| −5 db | 1.68 | 0.24 | 4.18 | $10^{-4}$ | 31 |
| −4 db | 1.495 | 0.33 | 3.72 | $10^{-3}$ | 42.6 |
| −3 db | 1.33 | 0.42 | 3.32 | $4 \times 10^{-3}$ | 55 |
| −2 db | 1.185 | 0.5 | 2.96 | 0.013 | 66 |
| −1 db | 1.055 | 0.58 | 2.64 | 0.032 | 79 |
| 0 db | 0.94 | 0.66 | 2.35 | 0.065 | 94 |
| 1 db | 0.838 | 0.7 | 2.09 | 0.12 | 105 |
| 2 db | 0.745 | 0.75 | 1.86 | 0.185 | 120 |
| 3 db | 0.665 | 0.79 | 1.66 | 0.26 | 134 |
| 4 db | 0.593 | 0.83 | 1.48 | 0.34 | 150 |
| 5 db | 0.528 | 0.87 | 1.32 | 0.46 | 168 |
| 6 db | 0.47 | 0.9 | 1.175 | 0.52 | 182 |
| 7 db | 0.42 | 0.92 | 1.05 | 0.58 | 191 |
| 8 db | 0.37 | 0.93 | 0.935 | 0.66 | 204 |
| 9 db | 0.333 | 0.94 | 0.826 | 0.70 | 210 |
| 10 db | 0.297 | 0.94 | 0.745 | 0.75 | 216 |

It is to be noted that the count for a normal noise level which is 94 in Table II is very close to the mean level of 96. A curve 199 of FIG. 3 shows the relatively wide range of the Table II detector. It is to be understood that the principles of the invention include any suitable variations of the system design parameters such as the weighting parameters.

Referring now back to FIG. 2, the circuit operation of the digital mean level detector in accordance with the invention will be further explained. The digital input signal which may be 8 bits, for example, is sent to both the threshold compare circuit 42 as well as to the signal delay register 28. If the signal exceeds the $T_2$ threshold in the threshold compare circuit 94 a 110 is generated, exceeds the lower threshold of the circuit 92 but not the threshold of the circuit 94, a 100 is generated and if neither threshold is exceeded the output is 000. This three bit number or signal on the leads 104 and 106 is sent both to the delay registers 48 and to the adder 118. Because the three weighted numbers 0, 4 and 6 are respectively represented by 000, 100 and 110, only two registers are required because a third register would contain only zeros. After a delay of 32 range bins, the signal in the registers 48 is subtracted from the accumulated sum in the accumulator 122. The difference signal from the subtractor 128 is added to the incoming signal in the adder 118 to provide the new sum for the sliding window substantially at each clock pulse. As a result, the accumulator 122 contains the sum of the weighted threshold crossings of 32 adjacent bits of information and as a new bit comes into the accumulator the oldest bit is discarded giving the moving window effect.

It is to be noted that the mean noise level is determined so that an offset threshold level can be accurately established. The determination is made at a very low threshold level so that a large number of crossings are provided for rapid response and for accuracy. Thus the mean level of the noise is determined with a large value for probability so that the number of samples may be relatively small for any desired $\sigma$ value.

At each range bin the accumulated sum is applied to the offset circuit 62 and the subtractor 134 where the sum is subtracted from the expected value of 96. A difference of 8 or 10 may correspond approximately to a 1 db error as read from the curves of FIG. 3 (or shown in Table I), which difference is divided by 8 (or by 10 if increased accuracy is desired) and then sent to the adder 144 of the detector circuit and to the detector comparator circuit 154 as well as through adder 162 to detector and comparator circuit 172. An example of the quantized signal levels that may be selected by the threshold circuits at the detector where the associated codes and probability of false alarm (PFA) rates are listed below:

TABLE III

| Count | Code | PFA | db above RMS noise |
|---|---|---|---|
| 3 | 0011 | 0.37 | 0 |
| 4 | 0100 | 0.18 | +2.5 |
| 5 | 0101 | 0.067 | +4.4 |
| 6 | 0110 | 0.018 | +6. |
| 7 | 0111 | 0.0045 | +7.36 |
| 8 | 1000 | 0.0007 | +8.5 |
| 9 | 1001 | 0.00013 | +9.54 |
| 10 | 1010 | 0.000014 | +10.54 |

The threshold circuits 146 and 166 are shown with respective detection thresholds code 0111 and code 1010. When the signal from the subtractor and comparator circuit 60 indicates an error of 1 or more db, the number from this circuit is added to or subtracted from the selected detection code, depending on the polarity of the number provided by the divide circuit 140. The codes may be selected with a separation of about 1 db in the usable area so that a 1 db noise level change causes a 1 db change in the detection threshold. If more accurate control on the false alarm rate is desired, more levels may be quantized into the noise so that the separation between adjacent codes is smaller.

Figure 6:
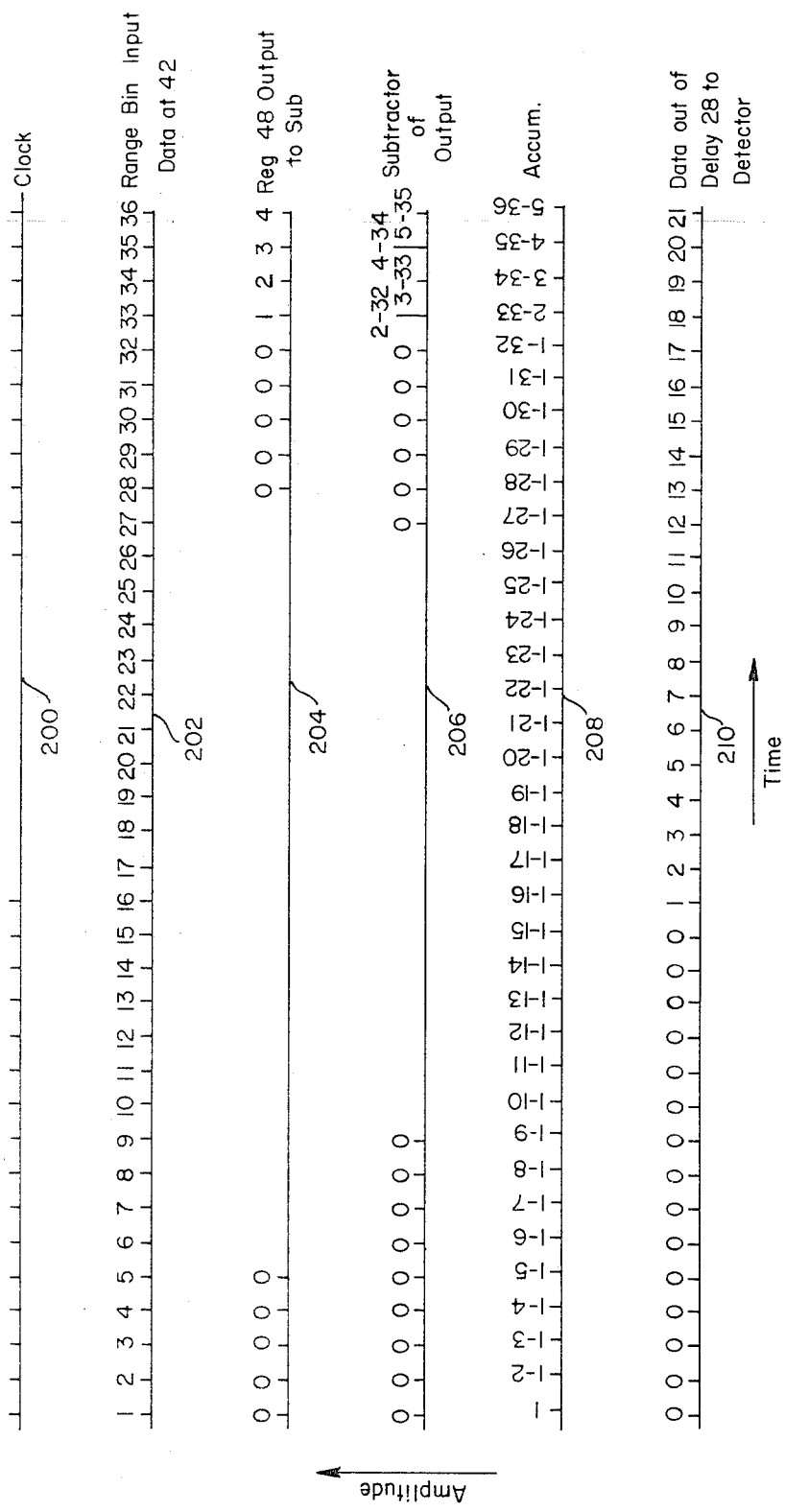
FIG. 6 is a schematic diagram of waveforms of amplitude versus time for further explaining the operation of the system of FIGS. 1 and 2.

Referring now to FIG. 6 as well as to FIG. 2, the detection operations will be explained in further detail in response to clock pulses of a waveform 200. The pulses of the waveform 202 show the digital data at the threshold compare circuit 42 from range bins 1 to 36. It is to be noted that the data of the waveform 202 may be received by the radar receiver several clock periods earlier, depending on the type of radar utilized or the data may be radar data stored for subsequent processing. The pulses of a waveform 204 show the output of the shift registers of the delay unit 48 which is zero until the 33rd range bin data of the waveform 202 is applied to the threshold unit 42. The subtractor output signal of the waveform 206 is zero until data is received at range bin number 33 at which time the output is data from range bin 2 - 32, which subtracted output signal is applied to the adder 118 where the newest data of range bin 33 is added thereto and stored in the accumulator as shown by a waveform 208. It is to be noted that the delay of delay register 117 is provided at the adder 118 so that the contents of the accumulator can be applied through the subtractor 128 prior to adding the difference to the new input data. This pattern continues such as at range bin 34, the register 48 outputs range bin 2 data to the subtractor, the subtractor outputs being 3 - 33 data to the adder 118 and the accumulator accumulates range bin data 3 to 34 after adding the range bin 34 data thereto. A waveform 210 shows the delayed data which may be 8 bits long, for example, at the output of the signal delay circuit 28 which is the input signal to be detected after a delay of 16 range bins so that detection occurs approximately at the center of the moving window. Thus in the illustrated arrangement, the moving window effect will have a width along the range sweep of 32 range bins but it is to be understood that any desired window length may be utilized. At the next range sweep or transmission of a pulse into space the sequence as described is repeated similar to that explained.

Although the illustrated system is utilized to provide a constant false alarm rate, the weightings may be varied to provide any desired characteristic such as a linear response within the principles of the invention. The system allows selection of thresholds at desired levels and the assigning of any appropriate weights at each threshold. Different weightings require different expected counts and threshold settings as well as other appropriate system parameters. A significant feature of the invention is that any desired weighting characteristics may be utilized.

Thus there has been described an improved detector that determines the mean level with a high probability and then utilizes that determination to control an offset detector so as to maintain a desired performance characteristic. When the mean level signal indicates an error of 1 or more db, the number from this circuit is added or subtracted to selected detection codes. As a result, a selected false alarm rate or other system characteristic representative of a selected code is then reliably maintained. By providing the codes with a separation of about 1 db in the usable area, for example, a 1 db noise level change causes a 1 db change in the detection threshold. It is to be noted that the system is not limited to any specific degree of accuracy but any desired number of levels may be quantized into the noise so that the separation between adjacent codes is of a smaller amount.

What is claimed is:

1. A detector responsive to a radar signal comprising analog-to-digital converter means responsive to said radar signal to develop a digital amplitude signal of a predetermined number of bits, amplitude limiting means coupled to said analog-to-digital converter means for passing a selected number of the least significant bits of said digital amplitude signal, threshold comparator means coupled to said amplitude limiting means and responsive to said digital amplitude signal, delay means responsive to said threshold comparator means, accumulator means responsive to said threshold comparator means, subtractor means responsive to said delay means and to said accumulator means, and coupled to an input of said accumulator means, dividing means coupled to the output of said accumulator means to provide a threshold error signal, and detector comparator means coupled to said dividing means for receiving said threshold error signal and responsive to said digital amplitude signal for detecting the occurrences of the value of said digital signal exceeding a controlled threshold value with a substantially constant false alarm rate.

2. The detector of claim 1 in which said accumulator means includes an adder for combining the output of said subtractor means and the output of said threshold comparator means.

3. The combination of claim 2 in which said threshold comparator means includes n threshold circuits each having a threshold at a different signal level with each providing a single bit output signal.

4. The detector of claim 3 in which said dividing means includes subtractor means for subtracting an expected value from the output of said subtractor means and includes a divider circuit responsive to said subtractor means for applying said threshold error signal to said detector comparator.

5. The detector of claim 4 in which said detector comparator means includes means for selecting detector thresholds and means for combining the selected threshold with said threshold error signal provided by said divider means.

6. A mean level detecting system for providing a substantially constant false alarm rate and being responsive to a digital radar signal having a selected plurality of bits during each of a plurality of clock intervals comprising amplitude limiting means responsive to said digital radar signal to pass a selected number of the least significant bits of said digital amplitude signal, threshold comparator means coupled to said amplitude limiting means and responsive to the least significant bits of said digital amplitude signal and having a plurality of threshold values for providing a threshold code signal representative of the value of said digital radar signal, delay means responsive to said threshold comparator means and providing a delay equal to a selected number of said clock intervals, accumulator means for accumulating a sum of the value of the signal provided by the threshold comparator means for a predetermined number of clock intervals, first subtractor means coupled to said delay means and to said accumulator means for subtracting the oldest data from said accumulated sum, first adder means coupled to said accumulator means and coupled to said threshold comparator means and to said subtractor means for combining the newest data with the output of said first subtractor means, second subtractor means coupled to said accumulator means and including means for storing an expected accumulated sum for subtracting the accumulated sum therefrom to provide a difference signal, dividing means coupled to said second subtractor means for scaling said difference signal, second adder means coupled to said dividing means, threshold code selection means coupled to said second adder means, signal delay means responsive to said digital radar signal, and detector means coupled to said second adder means and to said signal delay means for comparing the delayed digital signal with said threshold code after said code is combined with the scaled signal provided by said dividing means.

7. The combination of claim 6 in which said amplitude limiting means passes two least significant bits to provide hard limiting.

* * * * *